United States Patent [19]
Lau et al.

[11] Patent Number: 5,765,182
[45] Date of Patent: Jun. 9, 1998

[54] INTERLEAVING MEMORY ON SEPARATE BOARDS

[75] Inventors: Winnie K.W. Lau, Shapin, Hong Kong; Kaberi Banerjee, Hamilton, Canada

[73] Assignee: LSI Logic Corporation, Milpitas, Calif.

[21] Appl. No.: 762,309

[22] Filed: Dec. 9, 1996

Related U.S. Application Data

[63] Continuation of Ser. No. 421,314, Apr. 13, 1995, abandoned, which is a continuation of Ser. No. 363,237, Dec. 23, 1994, abandoned.

[51] Int. Cl.⁶ .................................................. G06F 12/00
[52] U.S. Cl. .................................................. 711/5; 711/157
[58] Field of Search ........................... 395/405, 454, 395/484, 485; 365/230.03; 711/5, 127, 157; 371/30, 40.1

[56] References Cited

U.S. PATENT DOCUMENTS

| | | | |
|---|---|---|---|
| 5,051,889 | 9/1991 | Fung et al. | 395/157 |
| 5,247,644 | 9/1993 | Johnson | 395/157 |
| 5,274,788 | 12/1993 | Koike | 395/157 |
| 5,280,594 | 1/1994 | Young et al. | 395/157 |
| 5,293,607 | 3/1994 | Brockmann et al. | 395/157 |
| 5,295,252 | 3/1994 | Torii et al. | 395/157 |
| 5,313,603 | 5/1994 | Takishima | 395/157 |
| 5,329,629 | 7/1994 | Horst et al. | 711/5 |
| 5,461,718 | 10/1995 | Tatosian et al. | 711/206 |

OTHER PUBLICATIONS

HT352 –Bus Control Unit –Preliminary Specification Jul. 18, 1994; Version 0.22.

HT355 –ECC and Data Pipeline –Preliminary Version Jul. 11, 1994; Version 0.22.

*Primary Examiner*—Jack A. Lane
*Attorney, Agent, or Firm*—Riches, McKenzie & Herbert

[57] ABSTRACT

This invention relates to an improved memory storage system which allows interleaving between two separate memory banks. In this way, data can be retrieved simultaneously from the two memory banks and placed on the data bus alternately. While the data from one data bank is on the data bus, data is being retrieved from the other data bank. In general, a data bank requires a number of wait states in order to retrieve data, during which no data is transferred onto the data bus from that particular data bank. However, by interleaving the data between two separate memory banks, data retrieved from the first memory bank can be placed on the data bus while the second memory bank is undergoing several wait states retrieving the next group of data. In this way, data is continuously placed on the data bus and the number of wait states during which no data is present on the data bus are decreased, preferably to zero. In one embodiment, the memory banks are on separate boards with separate buffers on each board for interfacing each memory bank with the data bus, and, a memory controller, separate from the buffers, selects both buffers when interleaving data between the memory banks on the two boards.

16 Claims, 4 Drawing Sheets

INTERLEAVING MEMORY ON SEPARATE BOARDS

RELATED APPLICATIONS

This application is a continuation of application Ser. No. 08/421,314, filed on Apr. 13, 1995, now abandoned, which is a continuation of U.S. application Ser. No. 08/363,237 filed Dec. 23, 1994, abandoned.

BACKGROUND OF THE INVENTION

This invention relates to computer systems and in particular an improved data storage system for use in computer systems. More particularly, the invention relates to a data storage system which permits interleaving of data between two separate memory banks, on the same board or on different boards.

It is known in the art to store sequential groups of data, generally grouped as bytes (8 bits) or other combinations of bits, sequentially in a single memory bank comprising one or more DRAM chips. This has worked well in the past because the time for storing and retrieving data in a memory bank has not represented a significant time loss to the system as a whole.

However, in order to improve the overall efficiency of a system in general, there is a need to improve the efficiency of each component of the overall computer system. In addition, as the efficiency of other components of the computer system improve, such as the central processing unit, it is desirable to improve the efficiency of the other components. In general, the slowest component in a computer system will set the pace of the computer system as a whole.

It is also apparent that any improvements should be as cost effective as possible. For example, it is possible to increase the efficiency of the main memory in a computer system by inserting high performance memory chips, but this would greatly increase the cost of the computer system as a whole.

In addition, there has been a need to provide scalability to a computer system so that the efficiency and performance of a computer system could be improved cheaply at a later time. However, it is important to maintain the cost of the base computer system, without the improvements, at a price comparable to the price of computer systems which are not scalable.

SUMMARY OF THE INVENTION

Accordingly, it is an object of this invention to at least partially overcome the disadvantages of the prior art. Also, it is an object of this invention to provide an improved type of memory system having improved overall performance and efficiency.

Accordingly, in one of its aspects, this invention resides in a computer system having an address bus and a data bus, a memory storage system comprising a first memory means for storing groups of data from the data bus in response to a first write control signal and later retrieving the groups of data in response to a first read control signal; a second memory means remotely located from the first memory means for storing groups of data from the data bus in response to a second write control signal and later retrieving the groups of data in response to a second read control signal; memory controller means for controlling memory storage by sending the first write control signal to the first memory means to store the data present on the data bus and for sending the first read control signal to the first memory means to retrieve data stored in the first memory means and by sending the second write control signal to the second memory means to store the data present on the data bus and for sending the second read control signal to the second memory means to retrieve data stored in the second memory means; and wherein the memory controller means controls memory storage so as to store sequential groups of data, which have sequential addresses and are consecutively presented on the data bus, alternately in the first memory means and then the second memory means by alternately sending the first write control signal to the first memory means to store a group of data and then sending the second write control signal to the second memory means to store a sequentially next group of data.

Further aspects of the invention reside in providing a computer system comprising an address bus and a data bus, a method of storing and retrieving sequential groups of data which have sequential addresses and are consecutively presented on the data bus to and from a first memory means and a second memory means separately connected to the data bus and address bus, said method comprising the steps of (a) storing a sequentially first group of data in the first memory means; (b) storing a sequentially second group of data in the second memory means; (c) storing a sequentially next group of data in the first memory means; (d) storing a sequentially next group of data in the second memory means; and (e) repeating steps (c) and (d) until the sequential groups of data have been stored.

Further aspects of the invention will become apparent upon reading the following detailed description and the drawings which illustrate the invention and preferred embodiments of the invention.

BRIEF DESCRIPTION OF THE DRAWINGS

In the drawings, which illustrate embodiments of the invention.

DETAILED DESCRIPTION OF PREFERRED EMBODIMENTS OF THE INVENTION

Figure 1:
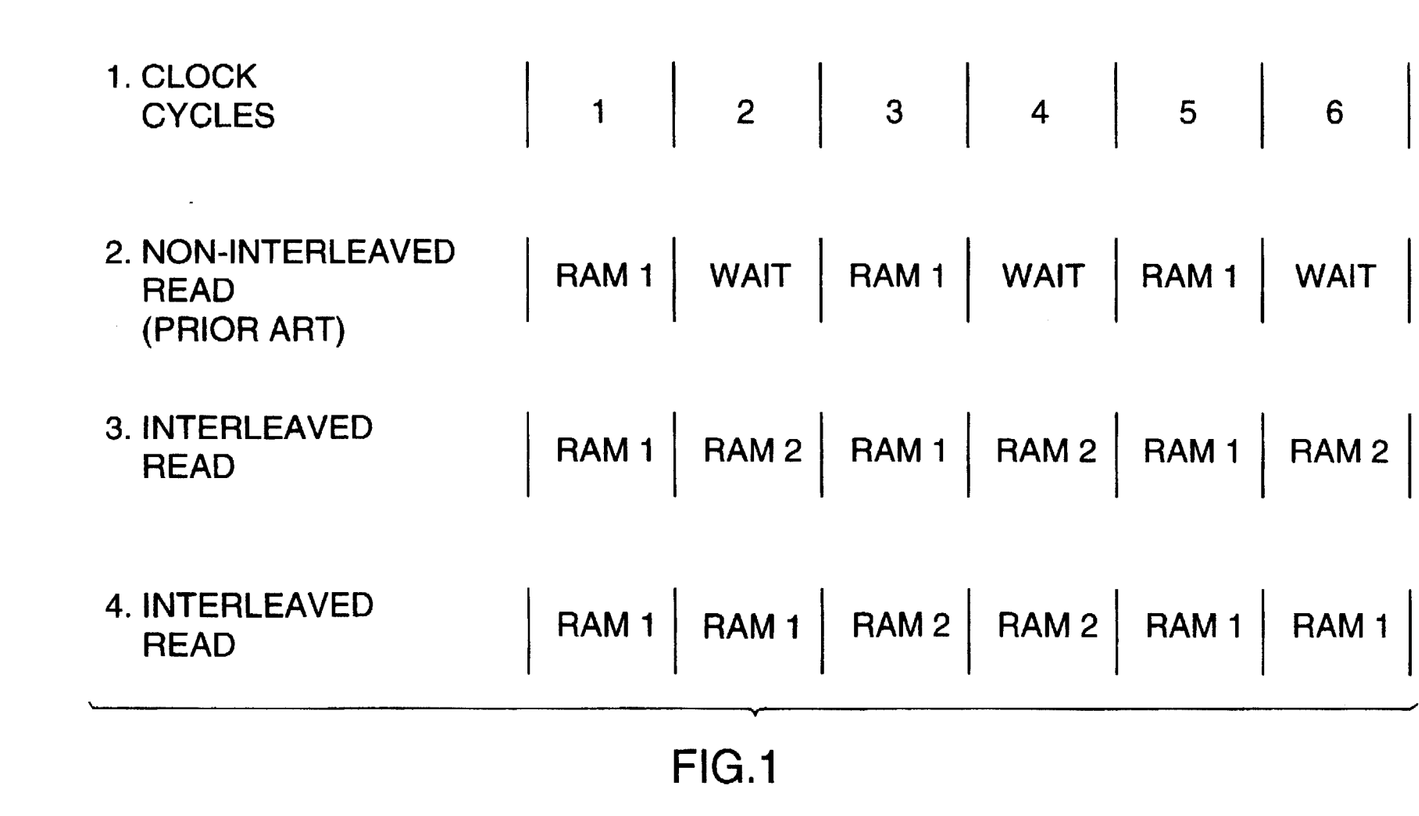
FIG. 1 shows a simplified timing diagram of a multi-clock data burst with interleaving, according to the present invention, and without interleaving.

FIG. 1 shows a simplified timing diagram for reading information from a memory bank comprising one or more random access memory chips. The first line of FIG. 1 shows clock cycles 1 through 6 generated by the system clock. Generally, the system clock will be between 30 MHz and 70 MHz as is known in the art.

The second line shows the signals on a data bus from a memory bank RAM1 being read from the memory bank and outputted on a data bus. This line shows the output from memory bank RAM1 during a burst read operation where other signals, such as address locations, need not be sent to the memory bank RAM1. It is apparent that data may only travel from memory bank RAM1 on every other clock cycle and that wait states must be present between each data transfer from memory bank RAM1. The wait states are necessary to permit memory bank RAM1 to provide the next group of information. Most memory banks cannot consecutively retrieve groups of information without a wait state of some duration.

The second and third lines of FIG. 1 show the wait states as being only one clock cycle. However, wait states of 2 cycles, or more, are common.

The third line of FIG. 1 shows the simplified timing diagram for the data retrieval from an interleaved memory system according to the present invention. As is seen from FIG. 1, groups of data are retrieved and placed on a data bus from two separate memory devices, RAM1 and RAM2. The information is interleaved in that the groups of data retrieved from memory devices RAM1 and RAM2 are sequential groups of information similar to that shown in the non-interleaved line at line 2 of FIG. 1. In other words, the groups of information shown at line 2 of FIG. 1 under clock cycles 1, 3 and 5 will be the same groups of information shown in line 3 of FIG. 1 under clock cycles 1, 2 and 3.

It is apparent that the information being read on the second line and the third line will be the same, however the information read on the third line will be read twice as fast as the information on the second line. In other words, the performance of the non-interleaved memory system shown at line 2 is limited by the bandwidth of the memory devices contained therein. However, the performance of the interleaved memory system shown at line 3 is limited only by the bandwidth of the bus and not by the bandwidth of the memory devices used in the memory subsystem, even though the RAM components used in the interleaved and non-interleaved memory systems are the same and require the same wait states.

The fourth line of FIG. 1 shows an interleaved read according to the present invention where two clock cycles are required to send on to the data bus all of the data in the first group of data stored in RAM1. In this case, the memory banks are twice the size of the data buses which means that each memory bank can hold twice the data which could be transferred over the data bus during any one clock cycle. In this way, two clock cycles are required to send all the data in each group of data, and the second memory bank RAM2 can have a wait cycle of up to two clock cycles to retrieve the second group of data without having a wait cycle appear on the data bus. This principle may be expanded so that a memory bank can hold three or four times the data which may be transferred on a data bus during a single clock cycle so that any memory bank may use three or four wait cycles to retrieve a group of data without having a wait cycle appear on the data bus.

In a preferred embodiment of the present invention, the memory banks RAM1 and RAM2 require two clock cycles to retrieve data stored therein. The memory banks RAM1 and RAM2 can hold 128 bits of data while the data bus 16 is only 64 bits wide.

Figure 2:
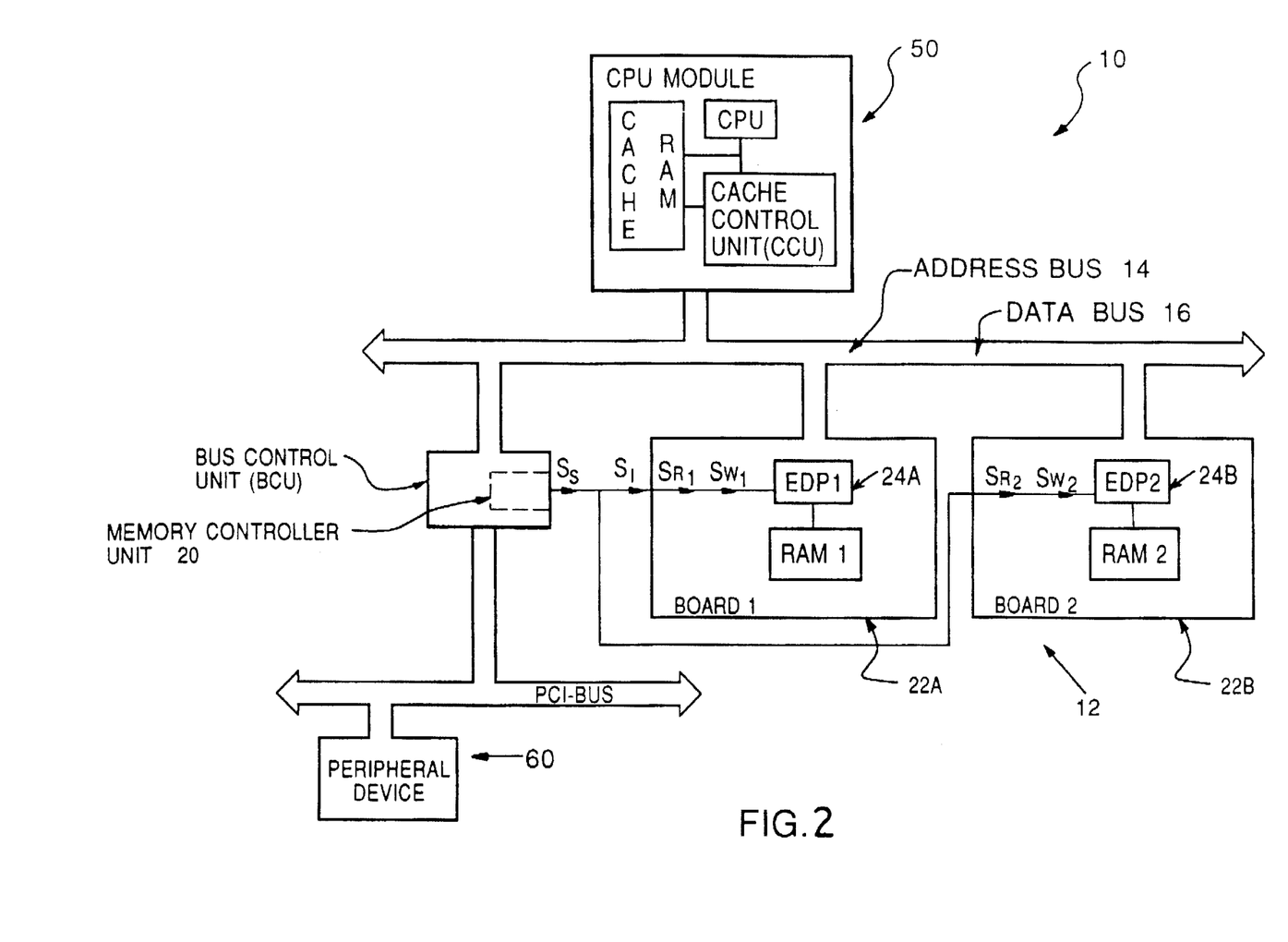
FIG. 2 is a schematic representation of a computer system incorporating the memory storage system of the present invention.

FIG. 2 shows a computer system, shown generally by reference numeral 10, having a memory system, shown generally as 12, which provides interleaving of data between two separate memory banks RAM1 and RAM2. The memory devices RAM1 and RAM2 can store and retrieve groups of data as is known in the art. In general, the groups of data can be bytes, words, or other combinations of bits. Each memory bank RAM1 and RAM2 comprises one or more self-contained chips having independent connections to the address bus 14 and data bus 16.

The chips are generally dynamic random access memory chips of different sizes, such as 4 Mbytes. While the memory system 10 can use chips of different maximum capacity, it is preferable that memory banks RAM1 and RAM2 which are interleaved have substantially identical maximum capacity.

Computer system 10 comprises a central processing unit ("CPU") shown on a CPU module 50. The CPU module 50 also comprises a cache RAM and a cache control unit CCU for interfacing with the address bus 14 and data bus 16.

In a preferred embodiment, as shown in FIG. 2, the address bus 14 and data bus 16 are temporarily multiplexed and comprise the same lines. In this way, when data is stored or retrieved, the address is sent first and the data is then read from or written into the memory system 12 or a peripheral device 60 on at least some of the same lines upon which the address was sent. In a preferred embodiment, the data bus 16 comprises 64 lines and the address bus 14 comprises 32 lines, which are also the first 32 lines of the data bus 16.

As is also shown in FIG. 2, the system 10 comprises a bus control unit BCU for controlling the address bus 14 and data bus 16 as well as providing a buffer to the peripheral component bus PCI. In addition, the bus control unit BCU comprises a memory controller unit 20 which sends control signals to the memory banks RAM1 and RAM2 to control the read and write operations as more fully described below. Attached Appendix A shows a preliminary specification for the bus control unit BCU, including a description of the memory controller unit 20. Appendix A shows a preferred embodiment of the invention used in a symmetrical multi-processing unit and forms part of this specification.

The memory controller unit 20 provides write control signals $S_W$ and read control signals $S_R$ to control the storing and retrieval of data in the memory system 12, including memory units RAM1 and RAM2. Memory controller unit 20 sends a write control signal $S_W$ to a memory unit, RAM1 or RAM2, to cause the memory unit, RAM1 or RAM2, to store the data presented on the data bus 16. Likewise, memory controller unit 20 sends a read control signal $S_R$ to the memory units, RAM1 or RAM2, to retrieve data stored in the memory units, RAM1 or RAM2. It is understood that while the present discussion relates to only two memory units, RAM1 and RAM2, several such memory units may be incorporated in the memory system 12 and each would be controlled in a similar manner by the memory controller unit 20.

In general, the memory controller unit 20 can operate in different modes of operation to store and retrieve information in the memory system 12 in different ways. In the mode of operation where sequential groups of data are to be interleaved between two memory units, RAM1 and RAM2, memory controller unit 20 operates to alternately send a first write control signal $S_{W1}$ to the first memory unit RAM1 to store the first group of data present on the data bus 16 and then, substantially immediately thereafter, sends a second write control signal $S_{W2}$ to the second memory unit RAM2 to store the next consecutively-sequential group or second group of data in the sequence. Memory controller unit then alternates between the first memory unit RAM1 and second memory unit RAM2 alternately storing the sequential groups of data in both memory units RAM1 and RAM2 by alternately sending the first write control signal $S_{W1}$, and the second write control signal $S_{W2}$. Accordingly, all the odd groups of data will be stored in the first memory unit RAM1 and all the even groups of data will be stored in the second memory unit RAM2.

Once the memory controller unit 20 has interleaved the sequential groups of data between memory units RAM1 and RAM2, it is possible to then retrieve the sequential groups of data alternately from the first memory unit RAM1 and the second memory unit RAM2 while recreating the same sequential groups of data in the same sequence. Memory controller unit 20 retrieves the sequential groups of data alternately from the first memory unit RAM1 and the second memory unit RAM2 by alternately sending a first read control signal $S_{R1}$ to the first memory unit RAM1 and a second control signal $S_{R2}$ to the second memory unit RAM2.

The first write control signal $S_{R1}$ refers to the combination of control signals which the first memory bank RAM1 will allow the first memory bank RAM1 to store a group of data in a memory location address within memory bank RAM1. The first write control signal $S_{W1}$, could be any combination of signals to accomplish this objective but preferably the first write control signal $S_{W1}$ comprises a write enable signal and appropriate row and column signals on the address bus 14 to select the first memory bank RAM1. Therefore, while FIG. 2 shows the first read control signal as being separate from the address bus $S_{W1}$, this is not necessarily the case and some of the signals forming the first write control signal $S_{W1}$, may be on the address bus 14. Likewise, the first read control signal $S_{R1}$ could be any combination of signals to allow the first memory bank RAM1 to retrieve a group of data in a memory location, and preferably are simply the appropriate row and column signals or the address bus 14 to select the first memory bank RAM1. In the case of both the storing and retrieving operations, the specific memory locations within the first memory bank RAM1 where the group of data is to be stored are determined by the lower order bits on the address bus 14. The operation of the second write control signal $S_{W2}$ and second read control signal $S_{R2}$ with respect to the second memory bank RAM2 is similar to that of the first write and read control signals $S_{W1}$ and $S_{R1}$, and the first memory means RAM1.

Because the memory units RAM1 and RAM2 require a wait state in between retrieving successive groups of data, the memory controller unit 20 provides the first read control signal $S_{R1}$ to the first memory unit RAM1 such that the first group of data is retrieved from memory unit RAM1 and then placed on the data bus 16 while the second read control signal $S_{R2}$ is sent to the memory unit RAM2 to retrieve the next or second group of data while the first group of data is on the data bus 16. The second group of data is then put on a data bus 16 on subsequent clock cycles. During these subsequent clock cycles, the memory controller unit 20 sends the first read control signal $S_{R1}$ to the first memory unit RAM1 to retrieve a third group of data such that the first memory unit RAM1 undergoes a wait state while the second group of data is on the data bus 16. By being on the data bus 16 is meant the lines comprising the data bus 16 undergo changes of state to high or low corresponding to the data in the groups of data so that other components connected to the data bus 16 can obtain the data.

This is repeated until all the sequential groups of data requested have been retrieved.

It is apparent that the information retrieved from the first memory unit RAM1 and the second memory unit RAM2 will appear on the data bus 16 as shown in line 3 of FIG. 1 representing the interleaved read. In particular, it is preferred that the wait states of the memory units RAM1 and RAM2 are substantially the same duration as the time required to transfer the groups of data on the data bus 16. In this way, no wait states will appear on the data bus 16 as shown in line 3 of FIG. 1 where during each clock cycle a group of data is being transferred.

The buffers 24a and 24b are data pipeline chips ("EDP chip"). The EDP chip comprises error correction circuitry ("ECC"), as well as write buffers and prefetch buffers to assist in interfacing with the data bus 16. Attached Appendix B is a detailed specification for the EDP chip according to a preferred embodiment of the invention.

In particular, the error correction circuitry is shown in more detail in this appendix. As can be seen from Appendix B, when the error correction circuitry of the EDP chip is operational it generates 8 bits representing the error correction code for each 64 bits of data to be stored. As the memory data bus is 128 bits wide, there are 16 bits of error correction code with each 128 bits of data, thereby creating a data bank size of 144 bits. However, as the error correction codes are only used by the EDP chip and do not appear on the data buses, they are not relevant to the present invention and each memory bank can be considered to store or retrieve groups of data comprising 128 bits.

The buffers 24a and 24b are located between the first and second memory units RAM1 and RAM2 and the data bus 16. It is apparent that one buffer 24a or 24b is required for each memory board 22a or 22b. In the preferred embodiment, as shown in the attached appendix B, the EDP chip accommodates only 64 bits of data, and therefore each buffer 24a and 24b comprises two EDP chips to accommodate the entire 128 bits of data on the memory data bus, but other arrangements are possible.

In the embodiment shown in FIG. 2, the memory units RAM1 and RAM2 are shown on separate boards, namely boards 22a and 22b, respectively. In this embodiment, the memory controller unit 20 comprises separate lines to select each of the boards 22a and 22b separately and simultaneously. In a preferred embodiment, the computer system 10 comprises slots for up to four memory boards (not shown). The memory controller 20 has 2 lines called SLOTSEL[1:0] which are connected to the EDP chips and select the target slot or target board 22 in one of the four possible slots by sending a select signal to the EDP chips on that board 22. When interleaving between two separate boards 22a and 22b, both boards are selected by the memory controller unit 20 by sending a select signal to the EDP chips on both boards 22a and 22b.

However, the invention equally applies to embodiments where the interleaved memory units, namely memory units RAM1 and RAM2, are on the same board, either board 22a or 22b. In this case, only the EDP chip on the board 22 having the appropriate memory units RAM1 and RAM2 would be accessed and the first and second read control signals $S_{R1}$, and $S_{R2}$ would alternately select the first and second memory units RAM1 and RAM2 on the same board 22a or 22b.

In addition to the select signal, the memory controller means 20, in one preferred embodiment, sends other interfacing control signals $S_I$ to the buffer means 24a and 24b. These interfacing control signals $S_I$ configure the buffer means 24a and 24b for different modes of operation such as interleaving or non-interleaving, error correction or non-error correction, and other modes of operation as described in Appendices A and B.

In a further preferred embodiment, as described above and in Appendices A and B, the memory system 12 stores groups of information in groups having twice the number of bits than the data bus 16 has lines. For example, in a preferred embodiment, the data bus 16 has 64 data lines but the memory system 12 stores groups of data having 128 bits. This can be accomplished by having a 128 bit bus on each of boards 1 and 2, shown generally by reference numerals 22a and 22b. The buffers 24a and 24b interface with the data bus 16 to output the 128 bit groups of information on to the 64 line data bus 16. It is apparent to output 128 bits of data on to data bus 16 at least two clock cycles are required to sequentially place on the data bus 16 the lower 64 bits of information followed by the higher 64 bits of information of the 128 bit group. In this way, at least two clock cycles are required to place on the data bus 16 each group of data. This means that each memory unit RAM1 and RAM2 can have up to two wait states in which to retrieve data without having a wait state appear on the data bus 16. In this way, by having the groups of data comprising twice the number of bits that the data bus 16 can accommodate in one cycle, the memory units RAM1 and RAM2 can have wait states of at least two cycles duration in which to retrieve a group of data and still not adversely effect the data transfer on the data bus 16.

Figure 3A:
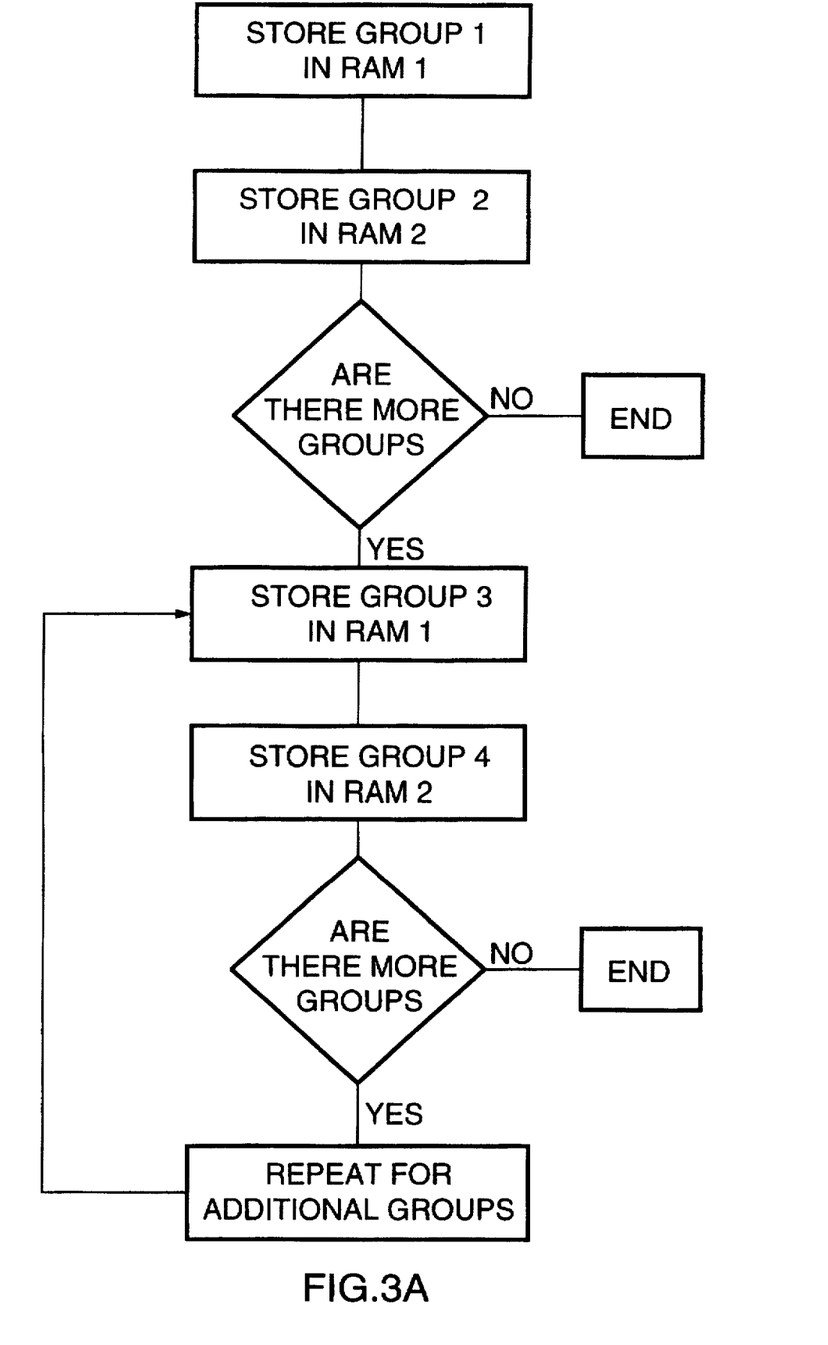
FIG. 3a shows a flow chart illustrating the sequence of operations completed to store data using the method of the present invention.
Figure 3B:
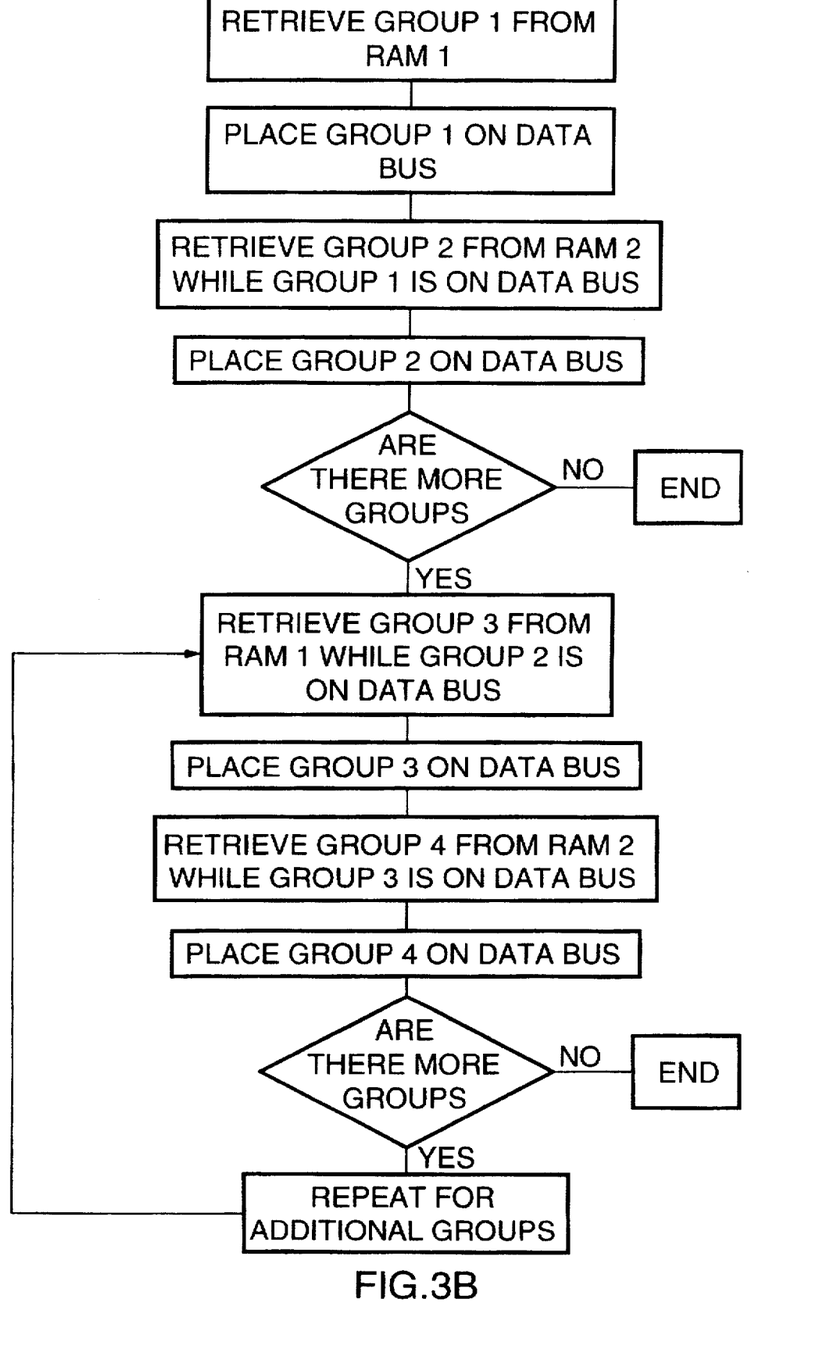
FIG. 3b shows a flow chart illustrating the sequence of operations completed to retrieve data using the method of the present invention.

The present invention also comprises the method of storing and retrieving interleaved groups of data onto separate memory units RAM1 and RAM2 as shown in FIG. 3(a) and FIG. 3(b).

As shown in FIG. 3(a) and discussed above, consecutively-sequential groups of information are alternately stored in separate memory units RAM1 and RAM2. For example, the first group, Group 1, is stored in RAM1 and the second group, Group 2, is stored in RAM2. This is continued until all the groups of data have been stored. FIG. 3(a) shows the case where four groups of data are stored, however, it is understood that additional groups of data, such as a fifth group, a sixth group, up to an $n^{th}$ may be stored in a similar manner.

The method for retrieving the information, as shown in FIG. 3(b), comprises the step of retrieving the first group of data from the first memory unit RAM1 and then placing it on the data bus 16 to be transmitted on the bus 16 to other components of the computer system 10. The second group of data is retrieved from the memory unit RAM2 while the first group is being placed onto the data bus 16. The second group of data is then placed onto the data bus 16. If additional groups of data are to be retrieved, third and fourth groups of data are retrieved in a similar manner to that of groups 1 and 2 as shown in FIG. 3(b). These steps are repeated until all the groups of data have been retrieved.

It is preferred that the groups of data be the same size. For example, in a preferred embodiment, each group of data is 128 bits in size as more fully described in Appendices A and B. Also, it is preferred that there be an even number of groups of data in each sequence so that each memory bank RAM1 and RAM2 stores the same number of groups. If a particular sequence of data does not comprise an even number of groups all of the same size, then memory controller unit 20 can interleave the initial sequences and then make a separate conventional read operation for any leftover data not capable of being grouped into two groups of the same size as the initial groups. The read operation to read this information can operate in the same way.

It should be noted that as most read and write operations to the memory system 12 are done in cache lines from the Cache RAM of the CPU module 50, it is possible to configure the system 10 so that the cache lines comprise an even number of sequential groups of data, all of the same size, and corresponding to the size of the memory banks RAM1 and RAM2. For example, in one embodiment, the cache control unit CCU can be configured to have a cache line size of 128 bytes per line. In this case, each cache line represents 1024 bits of data or 8 sequential groups of data of 128 bits each, which could be stored in two interleaved memory banks RAM1 and RAM2 with 4 groups of 128 bits in each memory bank RAM1 and RAM2. If a data bus of 64 lines is used, these 8 groups of 128 bits could be retrieved in 16 clock cycles rather than approximately 30 clock cycles if no interleaving was used. This clearly represents a significant time savings and increase in efficiency. In addition, in a symmetrical multi-processor system where more than one CPU module 50 is connected to the same data bus 16, by increasing the transfer of data to each CPU module 50, the data bus 16 is freed up much sooner to be used by another CPU module 50.

It is also preferred that the memory controller unit 20 be separate from the buffers 24a and 24b. In this way, a single memory controller 20 may be used with several buffers 24a and 24b. This assists in interleaving memory banks RAM1 and RAM2 which may be on separate boards 22a and 22b. Also, by having one memory controller 20 additional boards 22 may be added to the system 10 at minimal additional cost.

It will be understood that, although various features of the invention have been described with respect to one or another of the embodiments of the invention, the various features and embodiments of the invention may be combined or used in conjunction with other features and embodiments of the invention as described and illustrated herein.

Although this disclosure has described and illustrated certain preferred embodiments of the invention, it is to be understood that the invention is not restricted to these particular embodiments. Rather, the invention includes all embodiments which are functional, electrical or mechanical equivalents of the specific embodiments and features that have been described and illustrated herein.

The embodiments of the invention in which an exclusive property or privilege is claimed are defined as follows:

1. In a computer system having an address bus and a data bus, a memory storage system comprising:

a first memory means, located on a first memory board, for storing groups of data from the data bus in response to a first write control signal and later retrieving the groups of data in response to a first read control signal;

a second memory means, located on a second memory board remotely located from the first memory board for storing groups of data from the data bus in response to a second write control signal and later retrieving the groups of data in response to a second read control signal;

a first buffer means located on the first memory board between the first memory means and the data bus for interfacing the first memory means with the data bus after receiving a first board select control signal;

a second buffer means located on the second memory board between the second memory means and the data bus for interfacing the second memory means with the data bus after receiving a second board select control signal;

memory controller means for controlling memory storage by sending the first write control signal to the first memory means to store the data present on the data bus and for sending the first read control signal to the first memory means to retrieve data stored in the first memory means and by sending the second write control signal to the second memory means to store the data present on the data bus and for sending the second read control signal to the second memory means to retrieve data stored in the second memory means;

wherein the memory controller means sends the first board select control signal to the first buffer means when the memory controller means sends the first read control signal or the first write control signal and the memory controller means sends the second board select control signal to the second buffer means when the memory controller means sends the second read control signal or the second write control signal;

wherein the memory controller means controls memory storage so as to store sequential groups of data, which have sequential addresses and are consecutively presented on the data bus, alternately in the first memory means and then the second memory means by alternately sending the first write control signal to the first memory means to store a group of data and then sending the second write control signal to the second memory means to store a sequentially next group of data;

wherein each of the sequential groups of data comprises bits of information and each group has the same number of bits;

wherein the data bus comprises a number of lines such that the number of bits in each group is a whole number multiple of the number of lines of the data wherein the second memory means is electrically connected to the second buffer means by a second memory board data bus having a number of lines equal to the number of lines of the first memory board data bus; and wherein the first and second buffer means comprise error correction circuitry bus;

wherein the first memory means is electrically connected to the first buffer means by a first memory board data bus having a number of lines equal to or greater than the number of bits in sequential groups of data.

2. A memory storage system as defined in claim 1 wherein the memory controller means retrieves consecutive sequential groups of data alternately from the first memory means and the second memory means by sending the first read control signal to the first memory means and then sending the second read control signal to the second memory means.

3. A memory storage system as defined in claim 1 wherein the memory controller means sends the first read control signal to the first memory means to retrieve a sequentially first group of data and the memory controller means sends the second read control signal to the second memory means to retrieve a sequentially second group of data while the first group of data is on the data bus.

4. A memory storage system as defined in claim 3 wherein the memory controller means sends the first read control signal to the first memory means to retrieve a third group of data from the first memory means while the second group of data is on the data bus.

5. A memory storage system as defined in claim 4 further comprising a clock means for generating clock signals to the memory storage system; and wherein the first group of data and the second group of data are sent on the data bus on consecutive clock signals.

6. A memory storage system as defined in claim 5 wherein each of the memory buffer means are remotely located from the memory controller means and receive interfacing control signals, including the select signal, to configure and select the buffer means from the memory controller means.

7. A memory storage system as defined in claim 6 wherein when the memory controller means stores sequential groups of data alternately in the first memory means and the second memory means, the memory controller means sends the first select signal to the first buffer means and the second select signal to the second buffer means.

8. A memory storage system as defined in claim 7 wherein when the memory controller means retrieves sequential groups of data which have been stored alternately in the first memory means and the second memory means, the memory controller means sends the first select signal to the first buffer means and the second select signal to the second buffer means.

9. A memory storage system as defined in claim 8 wherein the first memory means has a maximum capacity and the second memory means has a maximum capacity and the maximum capacity of the first memory means equals the maximum capacity of the second memory means.

10. A memory storage system as defined in claim 9 wherein the first memory means is a first memory bank means comprising at least one dynamic random access memory chip and the second memory means is a second memory bank means comprising at least one dynamic random access memory chip and wherein the first memory bank means is substantially identical to the second memory bank means.

11. A memory storage system as defined in claim 1
wherein the number of bits in each group is about twice the number of lines of the data bus.

12. In a computer system comprising an address bus and a data bus, a method of storing and retrieving sequential groups of data which have sequential addresses and are consecutively presented on the data bus to and from a first memory means and a second memory means wherein the first memory means is on a first board having a first buffer means for interfacing the first memory means with the data bus and the second memory means is on a second board having a second buffer means for interfacing the second memory means with the data bus, said method comprising the steps of:

(a) storing a sequentially first group of data in the first memory means on the first board;

(b) storing a sequentially second group of data in the second memory means on the second board;

(c) storing a sequentially next group of data in the first memory means on the first board;

(d) storing a sequentially next group of data in tile second memory means on the second board; and (e) repeating steps (c) and (d) until the sequential groups of data have been stored;

wherein each of the sequential groups of data comprises bits of information and each group has the same number of bits of data;

wherein the data bus comprises a number of lines and wherein the number of bits in each group wherein the second memory means is electrically connected to the second buffer means by a second memory board data bus having a number of lines equal to the number of lines of the first memory board data bus; and wherein the first and second buffer means comprise error correction circuitry is a whole number multiple of the number of lines;

wherein the first memory means is electrically connected to the first buffer means by a first memory board data bus having a number of lines at least equal to the number of bits in each group.

13. The method as defined in claim 12 further comprising the steps of:

(f) retrieving the sequentially first group of data from the first memory means on the first board;

(g) retrieving the sequentially second group of data from the second memory means on the second board;

(h) retrieving the sequentially next group of data from the first memory means on the first board;

(i) retrieving the sequentially next group of data from the second memory means on the second board; and (j) repeating steps (h) and (i) until the sequential groups of data have been retrieved.

14. The method as defined in claim 13 further comprising the step of retrieving the second group of data from the second memory means while the first group of data is on the data bus.

15. The method as defined in claim 14 further comprising the step of placing the sequentially second group of data on the data bus immediately after the sequentially first group of data has been placed on the data bus.

16. The method as defined in claim 12 wherein the data bus comprises a number of lines and wherein the number of bits in each group is twice the number of lines.

\* \* \* \* \*

UNITED STATES PATENT AND TRADEMARK OFFICE
CERTIFICATE OF CORRECTION

PATENT NO. : 5,765,182
DATED : June 9, 1998
INVENTOR(S) : Winnie K.W. Lau, et al.

It is certified that error appears in the above-identified patent and that said Letters Patent is hereby corrected as shown below:

Column 9, line 21, after "data" – wherein the second memory means is electrically connected to the second buffer means by a second memory board data bus having a number of lines equal to the number of lines of the first memory board data bus; and wherein in the first and second buffer means comprise error correction circuitry – should be deleted and inserted on line 32, after "data".
Column 9, line 32, after "in" should read – the --.
Column 10, line 41, "tile" should read – the--.
Column 10, line 49, after group –wherein the second memory means is electrically connected to the second buffer means by a second memory board data bus having a number of lines equal to the number of lines of the first and second buffer means comprise error correction circuitry should be deleted and inserted on line 61, after "group".

Signed and Sealed this

Twenty-second Day of June, 1999

Attest:

Q. TODD DICKINSON

*Attesting Officer*    Acting Commissioner of Patents and Trademarks